(12) United States Patent
Goldberg et al.

(10) Patent No.: US 10,331,937 B2
(45) Date of Patent: Jun. 25, 2019

(54) METHOD AND SYSTEM FOR CONTEXT-DRIVEN FINGERPRINT SCANNING TO TRACK UNAUTHORIZED USAGE OF MOBILE DEVICES

(71) Applicant: INTERNATIONAL BUSINESS MACHINES CORPORATION, Armonk, NY (US)

(72) Inventors: Itzhack Goldberg, Hadera (IL); Jinho Hwang, Ossining, NY (US); Neil Sondhi, Pilisborosjeno (HU); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 15/491,502

(22) Filed: Apr. 19, 2017

(65) Prior Publication Data
US 2018/0307893 A1      Oct. 25, 2018

(51) Int. Cl.
| | | |
|---|---|---|
| *G06K 9/00* | (2006.01) | |
| *H04W 12/12* | (2009.01) | |
| *H04W 4/02* | (2018.01) | |
| *H04L 29/06* | (2006.01) | |
| *H04W 12/06* | (2009.01) | |
| *H04W 12/08* | (2009.01) | |

(52) U.S. Cl.
CPC ...... *G06K 9/00087* (2013.01); *H04L 63/0861* (2013.01); *H04W 4/02* (2013.01); *H04W 12/06* (2013.01); *H04W 12/12* (2013.01); *H04W 12/08* (2013.01)

(58) Field of Classification Search
CPC .... G06K 9/00087; H04W 4/02; H04W 12/12; H04W 12/08
USPC ........ 382/124, 115, 100, 116, 125; 713/182, 713/185, 186, 150, 168, 176; 340/5.2, 340/5.8, 5.81, 5.82, 5.83, 5.51, 5.52, 5.5; 455/410, 411; 726/2, 3, 5
See application file for complete search history.

(56) References Cited

U.S. PATENT DOCUMENTS

| | | | |
|---|---|---|---|
| 6,687,830 B2 | 2/2004 | Yang | |
| 7,403,644 B2 | 7/2008 | Bohn et al. | |
| 7,526,109 B2 | 4/2009 | Bohn et al. | |
| 8,249,557 B2* | 8/2012 | Xiao | H04M 1/67 340/5.52 |
| 8,604,906 B1 | 12/2013 | Halferty et al. | |

(Continued)

FOREIGN PATENT DOCUMENTS

| | | |
|---|---|---|
| WO | 2006044026 | 4/2006 |
| WO | 2015088537 | 6/2015 |

OTHER PUBLICATIONS

"Turn Off Screen With Fingerprint?", Nov. 11, 2015, http://web.archive.org/save/_embed/https://www.reddit.com/r/Nexus6P/comments/3s9ude/turn_off_screen_with_fingerprint/sort=new.

(Continued)

*Primary Examiner* — Sheela C Chawan
(74) *Attorney, Agent, or Firm* — F. Chau & Associates, LLC

(57) ABSTRACT

A method includes acquiring a fingerprint of a person using a fingerprint scanner of a mobile device to power-off the mobile device, determining that the person is not authorized to use the mobile device based on their fingerprint, and maintaining the mobile device in a power-on state unbeknownst to the person.

18 Claims, 5 Drawing Sheets

(56) References Cited

U.S. PATENT DOCUMENTS

| | | | |
|---|---|---|---|
| 8,868,036 B1 | 10/2014 | Nasserbakht et al. | |
| 8,905,303 B1* | 12/2014 | Ben Ayed | G06Q 20/223 |
| | | | 235/375 |
| 8,981,901 B1 | 3/2015 | Halferty et al. | |
| 9,064,139 B2 | 6/2015 | Fenrich et al. | |
| 9,407,754 B1* | 8/2016 | Benoit | H04M 1/72577 |
| 2003/0141959 A1 | 7/2003 | Keogh et al. | |
| 2006/0255907 A1 | 11/2006 | Min | |
| 2014/0176332 A1* | 6/2014 | Alameh | G06F 21/32 |
| | | | 340/665 |
| 2014/0323089 A1* | 10/2014 | Tang | H04W 12/06 |
| | | | 455/411 |
| 2016/0085341 A1 | 3/2016 | Konicek | |
| 2016/0321496 A1 | 11/2016 | Mather et al. | |
| 2017/0032166 A1* | 2/2017 | Raguin | G06F 3/033 |
| 2018/0196990 A1* | 7/2018 | Xu | G06F 3/048 |

OTHER PUBLICATIONS

"Unlock With Your Fingerprint", Sep. 24, 2016, https://web.archive.org/web/20160924203036/https://support.google.com/nexus/answer/6285273.

"How to Disable Fingerprint Unlock on my Samsung Galaxy S5", Oct. 12, 2016, https://web.archive.org/web/20161012045548/http://support.bell.ca/Mobility/Smartphones_and_mobile_internet/Samsung-Galaxy-S5.how_to_disable_fingerprint_unlock_on_my_samsung.

"How Can I Turn Off Fingerprint Scanner for Lock Screen and Go Back to Swipe?", Aug. 1, 2016, https://web.archive.org/web/20160801074208/http://forums.androidcentral.com/ask-question/521660-how-can-i-turn-off-fingerprint-scanner-lock-screen-go-back-swipe.html.

Kellex, "Forget Home Button Fingerprint Scanners, It's All About Power Button and Rear Placements", Oct. 13, 2015, https://web.archive.org/web/20151014125702/http://www.droid-life.com/2015/10/13/forget-home-button-fingerprint-scanners-its-all-about-power-button-and-rear-placements/.

Caldwell, Serenity & Ritchie, Ren, "Touch ID: Ultimate Guide", Aug. 15, 2016, https://web.archive.org/web/20161106213458/http://www.imore.com/touch-id.

Hanson, Matt, "10 XPERIA Z5 Tips and Tricks", Nov. 3, 2015, https://web.archive.org/web/20151213144518/http://www.techradar.com/how-to/phone-and-communications/mobile-phones/10-xperia-z5-tips-and-tricks-1308116.

Banerjee, Ankit, "6 Problems With the LG V10 and How to Fix Them", Jan. 13, 2016, https://web.archive.org/web/20160116060542/http://www.androidauthority.com/lg-v10-problems-fixes-666910.

"Device Lock: Samsung Galaxy Grand Prime", Aug. 4, 2016, https://support.t-mobile.com/docs/DOC-30537.

"Stop Listening for Fingerprint When Screen Off", Jan. 16, 2016, https://web.archive.org/web/20160116150255/http://stackoverflow.com/questions/34609427/stop-listening-for-fingerprint-when-screen-off.

Thomas, Dallas, "Prevent Thieves From Turning Off Your Stolen Nexus So You Can Locate it", Jun. 13, 2014, https://nexus5.gadgethacks.com/how-to/prevent-thieves-from-turning-off-your-stolen-nexus-so-you-can-locate-0155080/.

V., Chandrashekhar, "Prevent Your IPhone From Becoming Untraceable When Stolen: Quick Tip," Jul. 30, 2016, https://web.archive.org/web/20160730190606/http://www.igeeksblog.com/prevent-your-iphone-from-becoming-untraceable-when-stolen.

* cited by examiner

METHOD AND SYSTEM FOR CONTEXT-DRIVEN FINGERPRINT SCANNING TO TRACK UNAUTHORIZED USAGE OF MOBILE DEVICES

TECHNICAL FIELD

Exemplary embodiments of the inventive concept relate to a method and system for context-driven fingerprint scanning.

DISCUSSION OF RELATED ART

As usage of smartphones and other mobiles devices grows more prevalent, people are increasingly storing more personal, critical, and confidential data on them. The negative impact of theft and unauthorized use becomes greater, and thus, various methods of protection and security are implemented to guard against it.

Stolen mobile devices can be tracked and located by using location services and tracking apps. However, these tracking mechanisms typically require the mobile device to be on and tracking components activated. An unauthorized user can disable the tracking mechanisms by powering-off the mobile device, switching to "airplane mode," disabling location services, etc., and can subsequently manipulate the mobile device freely. Owners of stolen mobile devices have no way of knowing that the devices were turned off or disabled, apart from being unable to track them.

Authentication methods can provide an additional layer of security for mobile devices. For example, biometric information, such as fingerprints, can be scanned. However, fingerprint scans typically are used to unlock the mobile device (e.g., instead of a password), and the mobile device can still be turned off by an unauthorized user.

SUMMARY

According to an exemplary embodiment of the inventive concept, a method includes acquiring a fingerprint of a person using a fingerprint scanner of a mobile device to power-off the mobile device, determining that the person is not authorized to use the mobile device based on their fingerprint, and maintaining the mobile device in a power-on state unbeknownst to the person.

According to an exemplary embodiment of the inventive concept, a method includes acquiring a fingerprint of a person who is using a fingerprint scanner of a mobile device to trigger a power function of the mobile device, determining whether the person is authorized to use the mobile device in response to the acquisition of the fingerprint, turning off the mobile device if the person is authorized to use the mobile device, and keeping tracking components of the mobile device on if the person is not authorized to use the mobile device.

According to an exemplary embodiment of the inventive concept, a method includes receiving, at a fingerprint scanner of a mobile device, a fingerprint of a person attempting to power-off the mobile device, transmitting, from the mobile device to an external source, the fingerprint of the person, receiving, at the mobile device from the external source, an indication that the person is not authorized to use the mobile device, and reducing power at the mobile device.

BRIEF DESCRIPTION OF THE DRAWINGS

The above and other features of the inventive concept will become more apparent by describing in detail exemplary embodiments thereof, with reference to the attached drawings.

DETAILED DESCRIPTION OF THE EMBODIMENTS

Figure 1:
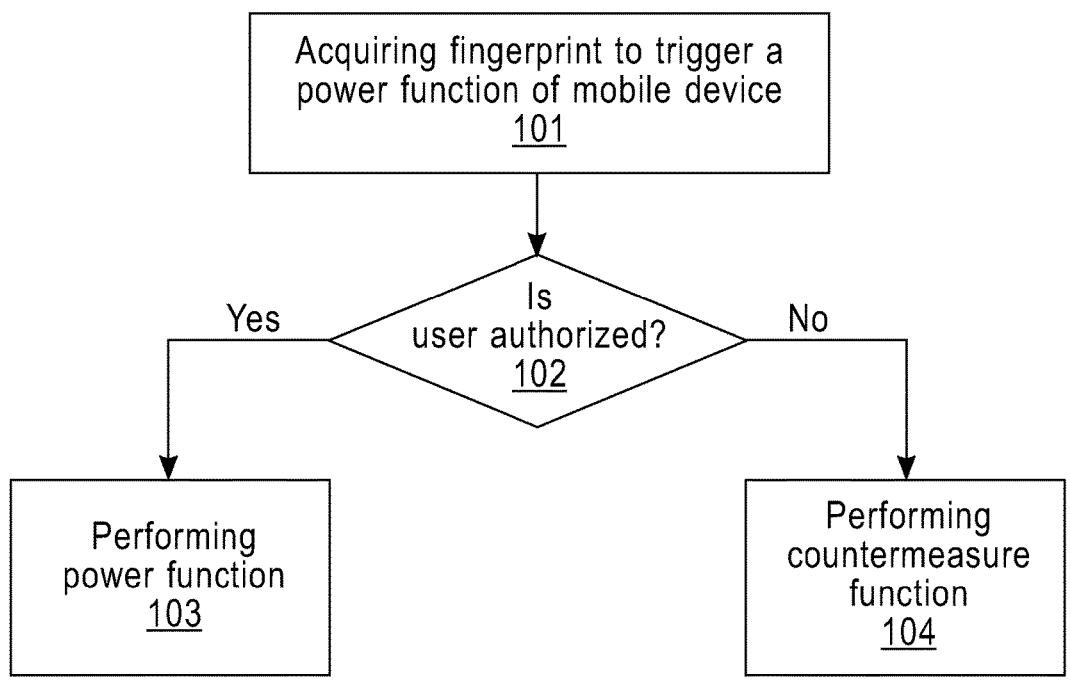
FIG. 1 is a flowchart illustrating a method for context-driven fingerprint scanning according to an exemplary embodiment of the inventive concept.

Exemplary embodiments of the inventive concept provide a method and system for context-driven fingerprint scanning to track unauthorized usage of mobile devices. For example, a power button of a mobile device may be completely replaced with a fingerprint scanner button (e.g., a home button). Thus, a fingerprint may be required to power-on or power-off the mobile device, which can provide additional security with relative ease. Furthermore, fingerprint authentication and authorization may be required only if current usage patterns and other contextual information do not match with that of an authorized user's.

Exemplary embodiments of the inventive concept will be described more fully hereinafter with reference to the accompanying drawings. Like reference numerals may refer to like elements throughout the specification and drawings.

FIG. 1 is a flowchart illustrating a method for context-driven fingerprint scanning according to an exemplary embodiment of the inventive concept.

Referring to FIG. 1, a fingerprint of a person is acquired or received using a fingerprint scanner of a mobile device to trigger a power function (operation 101). The power function may power-off or power-on the mobile device. For example, to power-off the mobile device, the person may need to provide their fingerprint to the fingerprint scanner.

The mobile device may be a smartphone, mobile computer, hand-held computer, portable digital assistant (PDA), tablet computer, wearable computer, etc.

According to an exemplary embodiment of the inventive concept, at least a portion of fingerprints scanned by the fingerprint scanner are recorded and stored in a database in the mobile device.

It is determining whether the person is authorized to use the mobile device based on or in response to the acquisition of the fingerprint (operation 102). For example, the fingerprint may be compared with an authorized fingerprint. For example, a database may be accessed to determine if the fingerprint is that of an authorized user. The database may be located on the mobile device or external to the mobile device.

The authorized user may be an owner of the mobile device and/or one or more people given authorization by the owner(s) of the mobile device. Each authorized user may have an authorized fingerprint stored in the database for verification of fingerprints scanned by the fingerprint scanner.

According to an exemplary embodiment of the inventive concept, it is determined whether the person is authorized to use the mobile device by comparing a current usage pattern of the mobile device to a learned usage pattern of the mobile device. The learned usage pattern is a usage pattern of the authorized user, including which apps are used, how frequently apps are used, fingerprint trails on a touchscreen, calls made, calls received, battery consumption, etc. The person may be determined to be authorized if the current usage pattern is within a predetermined threshold of the learned usage pattern.

According to an exemplary embodiment of the inventive concept, it is determined whether the person is authorized to use the mobile device by comparing how the mobile device is currently being physically held by the person to how the mobile device has been physically held in the past. For example, how the mobile device is physically held may be determined using position sensors of the mobile device. The authorized user may typically hold the mobile device in a certain position, e.g., inverted in a pocket. If the mobile device is currently being physically held at an unusual angle or its position significantly deviates from past physical positions, it may be determined that the person is not authorized to use the mobile device.

According to an exemplary embodiment of the inventive concept, it is determined whether the person is authorized to use the mobile device by determining whether the mobile device is in a new location. The location of the mobile device may be determined by location services thereof, which includes Global Positioning System (GPS) networks, Wi-Fi, Bluetooth, etc. For example, the authorized user may set a list of authorized locations and if the mobile device is in a new location outside the list, the person is determined to be unauthorized.

According to an exemplary embodiment of the inventive concept, it is determined whether the person is authorized to use the mobile device by comparing current connectivity patterns for the mobile device to learned connectivity patterns of the mobile device. For example, learned network connectivity patterns may include Wi-Fi networks that the authorized user typically connects to using the mobile device, such as a home or office network. The current connection connectivity patterns of the mobile device may be compared to the learned connectivity patterns to determine if the person is authorized.

According to an exemplary embodiment of the inventive concept, it is determined whether the person is authorized to use the mobile device by comparing footprints of devices currently near the mobile device to learned footprints of devices. The learned footprints are of devices commonly found in close proximity to the mobile device, e.g., in the surroundings of the authorized user. For example, the authorized user may typically operate the mobile device near devices of friends and family. Nearby devices may be connected to or "seen" by the mobile device via Near-field Communication (NFC), Bluetooth, Wi-Fi, etc. For example, the mobile device may store a list of Service Set Identifiers (SSIDs) of nearby Wi-Fi networks. As another example, the mobile device may store a list of nearby Bluetooth devices such as earphones or speakers, which may belong to the authorizer user or other people. Thus, if the footprints of devices currently near the mobile device are significantly different from the learned footprints of devices, it may be determined that person is unauthorized.

According to exemplary embodiments of the inventive concept, other methods may be used to determine whether the person is authorized to use the mobile device. For example, a camera of the mobile device may use facial recognition, a microphone of the mobile device may use voice recognition, etc. Additional security questions may be asked of the person using the mobile device, e.g., to request a password or social security number.

It is possible that an unauthorized user gains access to an authorized fingerprint to bypass fingerprint authentication. For example, the unauthorized user may use an image of the authorized fingerprint, may surreptitiously manipulate the authorized user while unconscious or asleep, may force the authorized user to provide their finger under duress, etc. Accordingly, additional authentication operations, as described above, may provide greater security for the mobile device.

According to an exemplary embodiment of the inventive concept, two or more of the above-described operations may be used to determine whether the person is authorized to use the mobile device.

According to an exemplary embodiment of the inventive concept, at least one second verification may be performed depending on a result of a first verification. For example, after the fingerprint of the person is authorized, the current connectivity patterns and footprints of nearby devices may be analyzed for further verification.

According to an exemplary embodiment of the inventive concept, if fingerprint verification is not set up or is disabled, the other operations described above may be used to verify the identity of the person using the mobile device.

Referring again to FIG. 1, if it is determined that the person is authorized to use the mobile device, the power function is performed (operation 103). For example, the mobile device may be turned off.

If it is determined that the person is not authorized to use the mobile device, a countermeasure function is performed (operation 104).

The countermeasure function may be at least one of the following: maintaining the mobile device in a power-on state unbeknownst to the person, reducing power of the mobile device, keeping tracking components of the mobile device on, tracking the mobile device, emailing the fingerprint to a predetermined address, etc.

For example, when the mobile device is maintained in the power-on state unbeknownst to the person, the mobile device may appear to be powered-off in a "false off" mode while still running core operations. As such, the person may be deceived into thinking the mobile device is off. The authorized user of the mobile device may be able to, for example, silently track the mobile device or erase some or all data on the mobile device. The mobile device may be configured to continue collecting data of the person to ascertain their identity while in the "false off" mode. This data may be transmitted to the authorized user or the police.

Power of the mobile device may be reduced. For example, the screen of the mobile device may be turned off to deceive the person using the mobile device. Additionally, by reducing power, battery life of the mobile device may be prolonged to facilitate tracking and control of the mobile device by the authorized user.

The tracking components of the mobile device may include a location tracking app or a GPS receiver. Accordingly, even if an unauthorized person powers off the device, the tracking components may remain on so that the mobile device can still be tracked by the authorized user. According to an exemplary embodiment of the inventive concept, the tracking components remain on in the "false off" mode.

Additionally, if the fingerprint is unauthorized, the fingerprint may be emailed to a predetermined or pre-configured address (e.g., an email address) of the authorized user to notify them about the unauthorized access. A notification with the fingerprint may also be sent to the police. Accordingly, the fingerprint may be compared to those in police records.

According to an exemplary embodiment of the inventive concept, regardless of whether or not the person is authorized to use the mobile device, tracking of the mobile device is performed. In other words, the location of the mobile device is always monitored, which may be subsequently used if an unauthorized person gains access to the mobile device (e.g., to determine if the mobile device is in a new location).

According to an exemplary embodiment of the inventive concept, the mobile device may be configured to require a fingerprint scan for any kind of disabling function, such as "airplane mode" or disabling location services. As such, operations 102-104 described above may be performed to verify the authorization of the person attempting the disabling function and to respond accordingly.

According to an exemplary embodiment of the inventive concept, the authorized user may set security policies for the mobile device. For example, the mobile device may be configured to only power-off when in certain locations such as at home or in the office. Additionally, the authorized user may activate context-driven fingerprint scanning, as described with reference to operations 101 to 104, for a specific period of time (e.g., weekends only) or for specific locations (e.g., restaurants, bars, other public places, outside of the home country of the authorized user).

Figure 2:
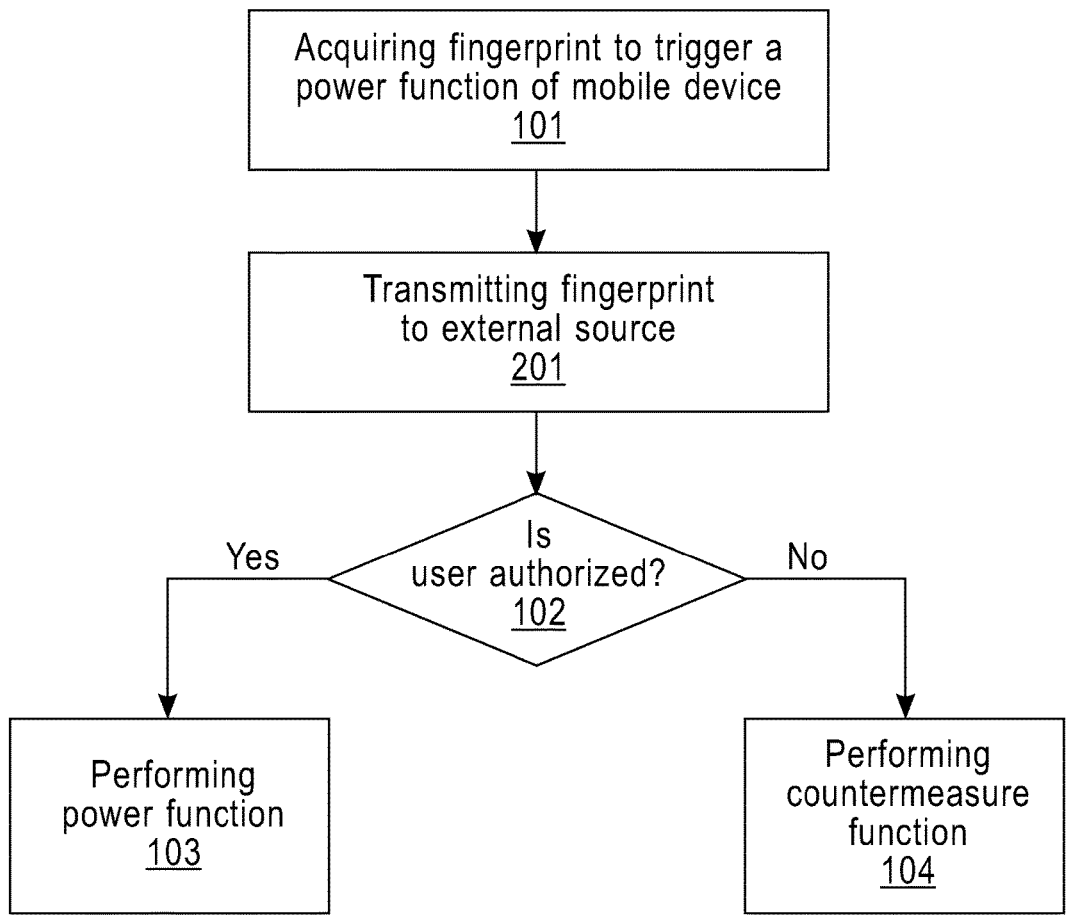
FIG. 2 is a flowchart illustrating a method for context-driven fingerprint scanning according to an exemplary embodiment of the inventive concept.

FIG. 2 is a flowchart illustrating a method for context-driven fingerprint scanning according to an exemplary embodiment of the inventive concept. Operations of FIG. 2 are substantially the same as those described with reference to FIG. 1, except that an additional operation 201 is performed.

After the fingerprint of the person is acquired in operation 101, the fingerprint is transmitted from the mobile device to an external source (operation 201). Instead of or in addition to the database of the mobile device, fingerprints may be recorded and stored in a database of the external source. The database of the external source may contain a set of authorized fingerprints to which the fingerprint is compared.

The mobile device receives an indication from the external source whether the person is authorized to use the mobile device. Accordingly, it is determined whether the person is authorized or not (operation 102). Based on that determination, either operation 103 or operation 104 is performed.

According to an exemplary embodiment of the inventive concept, location coordinates of the mobile device are transmitted from the mobile device to the external source. As such, the mobile device can be tracked and located. Data transmission between the mobile device and the external source may be performed wirelessly, such as through Wi-Fi, satellite, Bluetooth, etc.

According to an exemplary embodiment of the inventive concept, the external source is configured to perform any of the operations to determine whether the person is authorized to use the mobile device, as described above with reference to FIG. 1.

By using the external source to make the determination, less memory and processing power is required of the mobile device. Accordingly, battery consumption is reduced, allowing the mobile device to remain on for a longer period of time so that it can be tracked.

Figure 3:
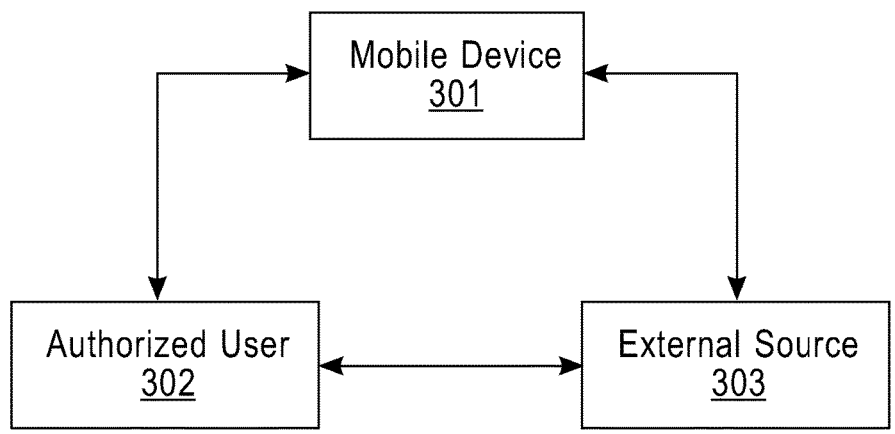
FIG. 3 is a block diagram illustrating a system for context-driven fingerprint scanning according to an exemplary embodiment of the inventive concept.

FIG. 3 is a block diagram illustrating a system for context-driven fingerprint scanning according to an exemplary embodiment of the inventive concept.

Referring to FIG. 3, the system for context-driven fingerprint scanning includes a mobile device 301, an authorized user 302, and an external source 303. When the authorized user 302 uses the mobile device 301, operations continue as normal. However, FIG. 3 illustrates an example relation between the mobile device 301, the authorized user 302, and the external source 303 when an unauthorized user attempts to operate the mobile device 301.

For example, if an unauthorized user gains access to the mobile device 301, the unauthorized user may attempt to power-off the mobile device 301 to disable tracking. The mobile device 301 may have a power button configured with a fingerprint scanner. Alternatively, the mobile device 301 may have both a power button and a fingerprint scanner, and be configured to require a fingerprint scan to power-off. These configurations will be described below with references to FIGS. 4A and 4B.

Accordingly, the fingerprint of the unauthorized user is acquired when attempting to power-off the mobile device 301 (e.g., operation 101 of FIG. 1). The fingerprint is transmitted to the external source 303 to determine whether the fingerprint is authorized. The external source 303 may use any of the above-described operations to make this determination.

The external source 303 transmits an indication back to the mobile device 301 that the unauthorized user is not authorized to use the mobile device 301. The external source 303 may also transmit a result of the determination to the authorized user 302 (e.g., by email).

After receiving the indication from the external source 303, the mobile device 301 performs at least one of the above-described countermeasure functions, such as maintaining the mobile device 301 in the "false off" mode.

The mobile device 301 may also transmit a notification to the authorized user 302 regarding the status thereof. Additionally, the authorized user 302 may transmit instructions to the mobile device 301 to activate or control countermeasure functions, and may set or change security policies or configurations stored in the external source 303 (e.g., through a website).

Thus, as described above, the mobile device 301, the authorized user 302, and the external source 303 may be able to communicate with one another to execute the method of context-driven fingerprint scanning according to an exemplary embodiment of the inventive concept.

According to an exemplary embodiment of the inventive concept, all above-described functions of the external source 303 are performed by the mobile device 302. In other words, the external source 303 may be excluded.

Figure 4A:
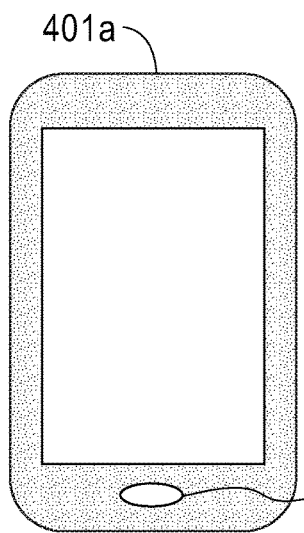
FIGS. 4A and 4B illustrate a mobile device including a fingerprint scanner according to exemplary embodiments of the inventive concept.
Figure 4B:
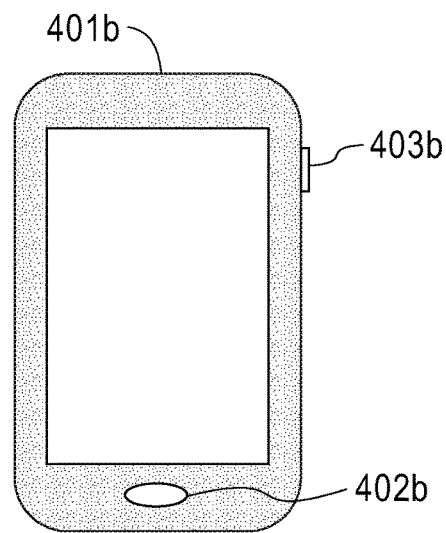

FIGS. 4A and 4B illustrate a mobile device including a fingerprint scanner according to exemplary embodiments of the inventive concept.

Referring to FIG. 4A, a mobile device 401a includes a fingerprint scanner 402a. The fingerprint scanner 402a is configured to operate as the power button for the mobile device 401a. Accordingly, a person must provide a fingerprint to power-on or power-off the mobile device 401a.

Referring to FIG. 4B, a mobile device 401b includes a fingerprint scanner 402b and a power button 403b. Here, the fingerprint scanner 402b and the power button 403b are separate hardware components of the mobile device 401b. Using software, a person can activate the above-described fingerprint scanning functions. For example, after activation, the power button 403b may be disabled and the fingerprint scanner 402b is used to power-on or power-off the mobile device 401b in lieu of the power button 403b. Alternatively, when a person attempts to power-on or power-off the mobile device 401b using the power button 403b, a software prompt may request a fingerprint scan by the fingerprint scanner 402b before completing the power function. Accordingly, the method for context-driven fingerprint scanning according to exemplary embodiments of the inventive concept may be performed.

Referring to both FIGS. 4A and 4B, each of the mobile device 401a and 401b includes a processor. The processors are configured to delegate power functions to the fingerprint scanners 402a and 402b. The processors are also configured to perform the fingerprint authorization and corresponding function thereafter, as described with reference to FIG. 1. A policy engine, knowledge base, and learning engine may be implemented through software. The policy engine is configured to enable a user to set security policies and retain user preferences regarding the method for context-driven fingerprint scanning. The knowledge base collects user information, such as user profiles, usage patterns, connectivity patterns, location patterns, movement patterns, position patterns, surrounding device footprints, etc. The learning engine is configured to learn through information in the knowledge base and trains a decision model to facilitate the user authorization. The learning engine may use a learning algorithm, such as a Support Vector Machine (SVM) learning algorithm.

With respect to FIGS. 4A and 4B, by having the fingerprint scanner operate as the power button, an additional level of security is provided to deter unauthorized users with minimal impact or burden on the authorized user. On the other hand, for example, if the mobile device instead required a password before power-off or power-on, the authorized user may be disinclined to use this feature as it takes additional time to enter the password. Moreover, a password may be less secure than a fingerprint.

Figure 5:
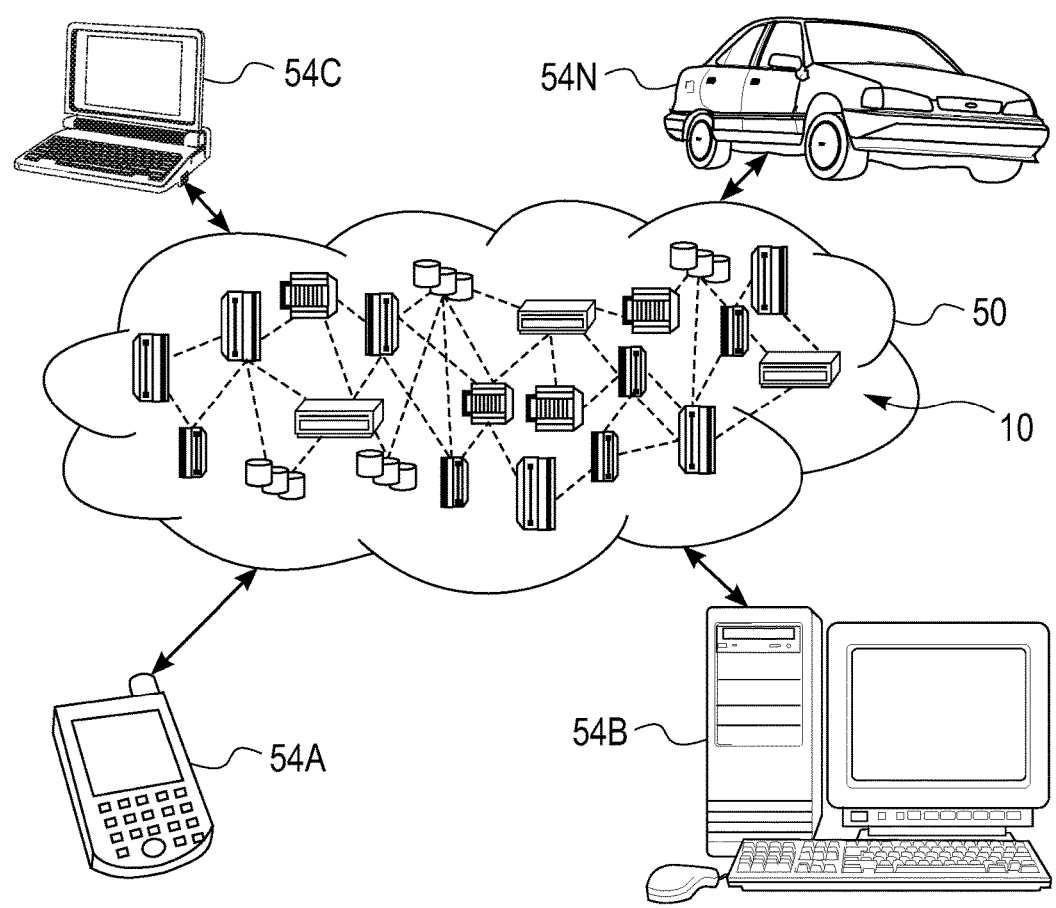
FIG. 5 depicts a cloud computing environment according to an exemplary embodiment of the inventive concept.
Figure 6:
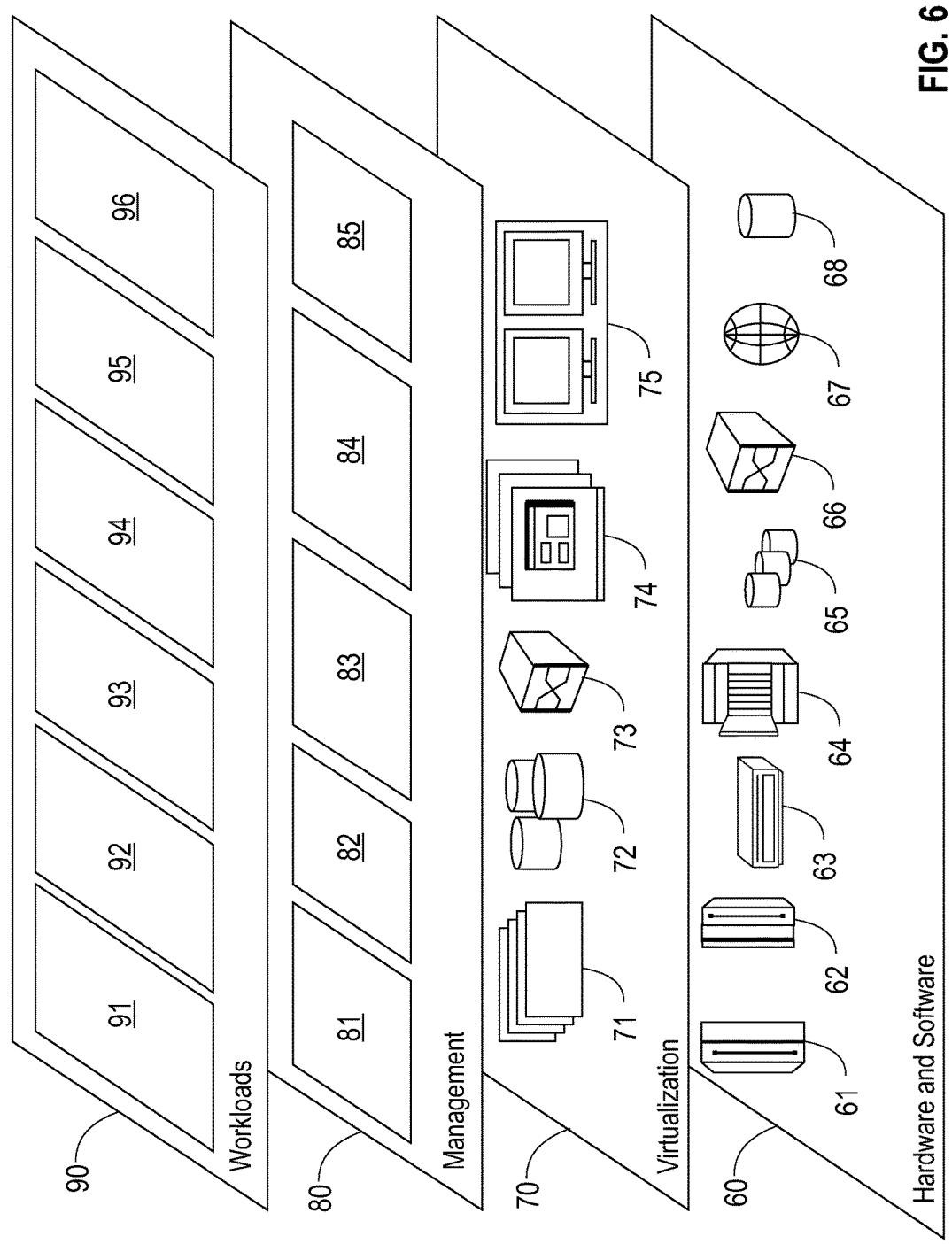
FIG. 6 depicts abstraction model layers according to an exemplary embodiment of the inventive concept.

FIG. 5 depicts a cloud computing environment according to an exemplary embodiment of the inventive concept. FIG. 6 depicts abstraction model layers according to an exemplary embodiment of the inventive concept.

It is understood in advance that although this disclosure includes a detailed description on cloud computing, implementation of the teachings recited herein are not limited to a cloud computing environment. Rather, embodiments of the inventive concept are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. For example, the cellular telephone 54A may correspond to the mobile device described above with reference to FIGS. 1 to 4B. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a mobile desktop 96.

With respect to the method and system for context-driven fingerprint scanning described above with reference to FIGS. 1 to 3, they may be configured across the plurality of layers of FIG. 6 within the cloud computing environment 50 of FIG. 5. For example, referring to FIGS. 3 and 6, the mobile device 301 may be configured at the hardware and software layer 60. The external source 303 may be configured at any of the hardware and software layer 60, the virtualization layer 70, the management layer 80, or the workloads layer 90.

As described above, according to exemplary embodiments of the inventive concept, the method and system for context-driven fingerprint scanning acquires a fingerprint of a person attempting to trigger a power function of a mobile device. Contextual scanning may authenticate the person using the fingerprint, as well as current behavioral and usage data compared against learned data of the authorized user, such as connectivity patterns, usage patterns, footprints of nearby devices, etc. When abnormal or unauthorized use of the mobile device is detected, external reports or notifications may be transmitted to the authorized user and other entities. Additionally, the mobile device may be placed in a "false off" mode with tracking components activated so that the mobile device can be tracked and located. Accordingly, security and protection of the mobile device may be increased.

While the inventive concept has been shown and described with reference to exemplary embodiments thereof, it will be understood by those of ordinary skill in the art that various changes in form and detail may be made therein without departing from the spirit and scope of the inventive concept as defined by the following claims.

We claim:

1. A method, comprising:
    acquiring a fingerprint of a person using a fingerprint scanner of a mobile device to power-off the mobile device;
    determining that the person is not authorized to use the mobile device based on the fingerprint; and
    maintaining the mobile device in a power-on state unbeknownst to the person,
    wherein, in the power-on state unbeknownst to the person, a screen of the mobile device is turned off while power is still provided to tracking components of the mobile device.

2. The method of claim 1, further comprising tracking the mobile device.

3. The method of claim 1, wherein the person is determined not to be authorized to use the mobile device by comparing the fingerprint with an authorized fingerprint.

4. The method of claim 1, further comprising wirelessly transmitting the fingerprint to an external source.

5. The method of claim 1, further comprising emailing the fingerprint to a predetermined address.

6. The method of claim 1, wherein the mobile device is a smartphone.

7. A method, comprising:
    acquiring a fingerprint of a person who is using a fingerprint scanner of a mobile device to trigger a power function of the mobile device;

determining whether the person is authorized to use the mobile device in response to the acquisition of the fingerprint;

turning off the mobile device if the person is authorized to use the mobile device; and keeping tracking components of the mobile device on if the person is not authorized to use the mobile device, wherein determining whether the person is authorized to use the mobile device comprises comparing current connectivity patterns for the mobile device to learned connectivity patterns of the mobile device, or comparing footprints of devices currently near the mobile device to learned footprints of devices.

8. The method of claim 7, wherein determining whether the person is authorized to use the mobile device comprises accessing a database to determine if the fingerprint is that of an authorized user.

9. The method of claim 7, wherein determining whether the person is authorized to use the mobile device comprises comparing a current usage pattern of the mobile device to a learned usage pattern of the mobile device.

10. The method of claim 7, wherein determining whether the person is authorized to use the mobile device comprises comparing how the mobile device is currently being physically held by the person to how the mobile device has been physically held in the past.

11. The method of claim 7, wherein determining whether the person is authorized to use the mobile device comprises determining whether the mobile device is in a new location.

12. The method of claim 7, further comprising tracking the mobile device when the person is not authorized to use the mobile device.

13. The method of claim 7, wherein the power function is power-off or power-on of the mobile device.

14. The method of claim 7, wherein the mobile device is a smartphone.

15. The method of claim 7, wherein the tracking components include a location tracking app or a global positioning system receiver.

16. A method, comprising:

receiving, at a fingerprint scanner of a mobile device, a fingerprint of a person attempting to power-off the mobile device;

transmitting, from the mobile device to an external source, the fingerprint of the person;

receiving, at the mobile device from the external source, an indication that the person is not authorized to use the mobile device; and reducing power at the mobile device in response to receiving the indication that the person is not authorized to use the mobile device, wherein the indication that the person is not authorized to use the mobile device is determined by comparing current connectivity patterns for the mobile device to learned connectivity patterns of the mobile device, or comparing footprints of devices currently near the mobile device to learned footprints of devices.

17. The method of claim 16, further comprising transmitting, from the mobile device to the external source, location coordinates of the mobile device.

18. The method of claim 16, wherein the mobile device is a hand-held computer.

* * * * *